(12) United States Patent
Witt

(10) Patent No.: US 10,220,420 B2
(45) Date of Patent: Mar. 5, 2019

(54) BIN SWEEP POWER TRANSMISSION SYSTEM

(71) Applicant: William A. Witt, Perham, MN (US)

(72) Inventor: William A. Witt, Perham, MN (US)

(73) Assignee: Sioux Steel Company, Sioux Falls, SD (US)

( * ) Notice: Subject to any disclaimer, the term of this patent is extended or adjusted under 35 U.S.C. 154(b) by 225 days.

(21) Appl. No.: 15/058,891

(22) Filed: Mar. 2, 2016

(65) Prior Publication Data

US 2016/0256899 A1  Sep. 8, 2016

Related U.S. Application Data

(60) Provisional application No. 62/126,921, filed on Mar. 2, 2015.

(51) Int. Cl.
| | | |
|---|---|---|
| *B08B 9/08* | (2006.01) | |
| *B65G 65/46* | (2006.01) | |
| *B08B 1/04* | (2006.01) | |
| *B65G 65/48* | (2006.01) | |

(52) U.S. Cl.
CPC ............ *B08B 1/04* (2013.01); *B08B 9/08* (2013.01); *B65G 65/4836* (2013.01)

(58) Field of Classification Search
CPC ............................. B08B 9/08; B65G 65/4836
See application file for complete search history.

(56) References Cited

U.S. PATENT DOCUMENTS

| | | |
|---|---|---|
| 822,547 A | 6/1906 | Nicolson |
| 2,646,023 A | 7/1953 | Virgil |
| 2,722,305 A | 11/1955 | McCabe |
| 2,763,362 A | 9/1956 | Greaves |
| 2,801,137 A | 7/1957 | Clay |
| 3,014,575 A | 12/1961 | Klein |
| 3,035,718 A | 5/1962 | Behlen |
| 3,065,996 A | 11/1962 | Patz |
| 3,067,914 A | 12/1962 | Ellaby |
| 3,175,676 A | 3/1965 | Vander Schaff |

(Continued)

FOREIGN PATENT DOCUMENTS

| | | |
|---|---|---|
| CA | 2312068 | 12/2001 |
| FR | 1032110 | 6/1953 |

(Continued)

OTHER PUBLICATIONS

Sudenga Industries, Inc., Press Release, Nov. 1, 2004, pp. 1-3.

(Continued)

*Primary Examiner* — Randall Chin

(74) *Attorney, Agent, or Firm* — Jeffrey A. Proehl; Woods, Fuller, Shultz & Smith, PC

(57) ABSTRACT

A central assembly for a bin sweep apparatus having at least two sweep elements movable substantially independently of each other about the central assembly may comprise a center post and a pair of sweep interface assemblies on the center post. Each sweep interface assembly may be associated with one of the sweep elements of the bin sweep apparatus. In some embodiments, each sweep interface assembly may be configured to sense a position of one of the sweep elements. In some embodiments, each sweep interface assembly may be configured to provide power to one of the sweep elements.

20 Claims, 9 Drawing Sheets

(56) References Cited

U.S. PATENT DOCUMENTS

| | | | |
|---|---|---|---|
| 3,181,715 A | 5/1965 | Olson |
| 3,204,786 A | 9/1965 | Kucera |
| 3,228,514 A | 1/1966 | Kucera |
| 3,229,665 A | 1/1966 | Baltz |
| 3,229,827 A | 1/1966 | Kucera |
| 3,231,106 A | 1/1966 | Bruecker |
| 3,291,325 A | 12/1966 | Henningson |
| 3,297,146 A | 1/1967 | Munger |
| 3,338,636 A | 8/1967 | Chapman |
| 3,438,517 A | 4/1969 | Steffen |
| 3,451,567 A | 6/1969 | Laidig |
| 3,455,470 A | 7/1969 | Kanagy |
| 3,472,357 A | 10/1969 | Strocker |
| 3,486,643 A | 12/1969 | Smith |
| 3,532,232 A | 10/1970 | Sukup |
| 3,647,094 A | 3/1972 | Jackson |
| 3,828,916 A | 8/1974 | Patz |
| 3,838,780 A | 10/1974 | Ridlehuber |
| 3,908,840 A | 9/1975 | Lambert |
| 3,946,496 A | 3/1976 | Sukup |
| 3,946,861 A | 3/1976 | Sandefur |
| 3,974,908 A | 8/1976 | Keichinger |
| 3,986,600 A | 10/1976 | Pentith |
| 4,022,335 A | 5/1977 | Lambert |
| RE29,309 E | 7/1977 | Patterson |
| 4,057,151 A | 11/1977 | Weaver |
| 4,230,222 A | 10/1980 | Clark |
| 4,242,028 A | 12/1980 | Van Dusen |
| 4,313,705 A | 2/1982 | Jackson |
| 4,329,105 A | 5/1982 | Buschbom |
| 4,451,192 A | 5/1984 | Wood |
| 4,516,898 A | 5/1985 | Cantenot |
| 4,578,012 A * | 3/1986 | Petit | B65G 65/4836 222/236 |
| 4,583,903 A | 4/1986 | Hutchison |
| 4,585,385 A | 4/1986 | Buschbom |
| 4,619,330 A | 10/1986 | Machnee |
| 4,619,577 A | 10/1986 | Swanson |
| 4,621,968 A | 11/1986 | Hutchison |
| 4,655,666 A | 4/1987 | Cantenot |
| 4,658,911 A | 4/1987 | Drever |
| 4,669,941 A | 6/1987 | West |
| 4,762,220 A | 8/1988 | Lutke |
| 4,773,808 A | 9/1988 | Fischer |
| 4,775,278 A | 10/1988 | Fischer |
| 4,824,312 A | 4/1989 | Schiltz |
| 4,875,820 A | 10/1989 | Lepp |
| 4,998,855 A | 3/1991 | Tschernatsch |
| 5,088,871 A | 2/1992 | Mellish |
| 5,099,983 A | 3/1992 | Valdez |
| 5,186,596 A | 2/1993 | Boucher |
| 5,203,802 A | 4/1993 | Denis |
| 5,540,533 A | 7/1996 | Eskelinen |
| 5,639,200 A | 6/1997 | Jiskoot |
| 5,769,590 A | 6/1998 | Weikel |
| 5,788,055 A | 8/1998 | Stewart |
| 5,947,261 A | 9/1999 | Baker |
| 6,017,180 A | 1/2000 | Wilham |
| 6,039,647 A | 3/2000 | Weikel |
| 6,203,261 B1 | 3/2001 | South |
| 6,254,329 B1 | 7/2001 | Sukup |
| 6,280,331 B1 | 8/2001 | Tuttlebee |
| 6,281,610 B1 | 8/2001 | Kliman |
| 6,499,930 B1 | 12/2002 | Dixon |
| 6,619,473 B2 | 9/2003 | Romeo |
| 6,640,451 B1 | 11/2003 | Vinarcik |
| 6,948,902 B2 | 9/2005 | Hanig |
| 7,210,538 B2 | 5/2007 | Gust |
| 7,544,031 B2 | 6/2009 | Kaeb |
| 7,588,405 B2 | 9/2009 | Johnson |
| 7,967,542 B2 | 6/2011 | Epp |
| 8,657,025 B2 | 2/2014 | Thompson |
| 8,770,388 B1 | 7/2014 | Chaon |
| 9,120,633 B2 | 9/2015 | Ahlen |
| 9,199,807 B1 | 12/2015 | Schuelke |
| 9,288,946 B1 | 3/2016 | Schuld |
| 9,290,335 B1 * | 3/2016 | Witt | B65G 65/4836 |
| 9,862,545 B2 | 1/2018 | Kaeb |
| 2004/0146381 A1 | 7/2004 | Hanson |
| 2004/0213650 A1 | 10/2004 | Epp |
| 2005/0254922 A1 | 11/2005 | Berraeu |
| 2005/0263372 A1 | 12/2005 | Hollander |
| 2006/0245864 A1 | 11/2006 | Epp |
| 2006/0285942 A1 | 12/2006 | Fridgen |
| 2009/0041566 A1 | 2/2009 | Lambertini |
| 2010/0239399 A1 | 9/2010 | Hoogestraat |
| 2013/0064629 A1 | 3/2013 | Schuelke |
| 2013/0216341 A1 | 8/2013 | Luster |
| 2015/0225190 A1 | 8/2015 | Witt |

FOREIGN PATENT DOCUMENTS

| | | |
|---|---|---|
| FR | 2309442 | 11/1976 |
| FR | 2348132 | 11/1977 |
| FR | 2630620 | 11/1989 |
| GB | 1327791 | 8/1973 |
| GB | 2069448 | 8/1981 |
| GB | 2076357 | 12/1981 |

OTHER PUBLICATIONS

G & G Manufacturing SC-X 4 Ratchet Slip Clutches, Jun. 17, 2012, https://web.archive.org/web/20120617003451/http://www.ggmfg.com/Products/CouplersClutches/SCX4RatchetSlipClutches.aspx.

Wen-Bin Du, Qun Fang, Qiao-Hong He, and, and Zhao-Lun Fang. "High-Throughput Nanoliter Sample Introduction Microfluidic Chip-Based Flow Injection Analysis System with Gravity-Driven Flows", Analytical Chemistry 2005 77 (5), pp. 1330-1337.

Jayas, Digvir S., and Noel DG White. "Storage and drying of grain in Canada: low cost approaches." Food control 14.4 (2003): pp. 255-261.

* cited by examiner

BIN SWEEP POWER TRANSMISSION SYSTEM

REFERENCE TO RELATED APPLICATION

This application claims the benefit of U.S. Provisional Patent Application No. 62/126,921, filed Mar. 2, 2015, which is hereby incorporated by reference in its entirety.

BACKGROUND

Field

The present disclosure relates to bin sweeps and more particularly pertains to a new bin sweep power transmission system for providing an interface between moving sweeps and a central post to transfer power, position information, etc. between the sweeps and the central post.

SUMMARY

In one aspect, the present disclosure relates to a central assembly for a bin sweep apparatus having at least two sweep elements movable substantially independently of each other about the central assembly. The assembly may comprise a center post, and a pair of sweep interface assemblies on the center post, each sweep interface assembly being associated with one of the sweep elements of the bin sweep apparatus. Each sweep interface assembly may be configured to sense a position of one of the sweep elements.

In another aspect, the present disclosure relates to a central assembly for a bin sweep apparatus having at least two sweep elements movable substantially independently of each other about the central assembly. The assembly may comprise a center post, and a pair of sweep interface assemblies on the center post, each sweep interface assembly being associated with one of the sweep elements of the bin sweep apparatus. Each sweep interface assembly may be configured to provide power to one of the sweep elements.

In still another aspect, the present disclosure relates to a bin sweep system may comprise a center post, a first sweep segment, a second sweep segment, a first sweep segment connector configured to connect the first sweep segment to the center post in a manner such that the first sweep segment is rotatable with respect to the center post, and a second sweep segment connector configured to connect the second sweep segment to the center post in a manner such that the second sweep segment is rotatable with respect to the center post. The first and second sweep segment connectors may be configured such that the first sweep segment is rotatable about the center post past the second sweep segment. The system may also include a first sweep interface assembly configured to provide electrical power to the first sweep segment as the first sweep segment moves past the second sweep segment and a second sweep interface assembly configured to provide electrical power to the second sweep segment;

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1A:
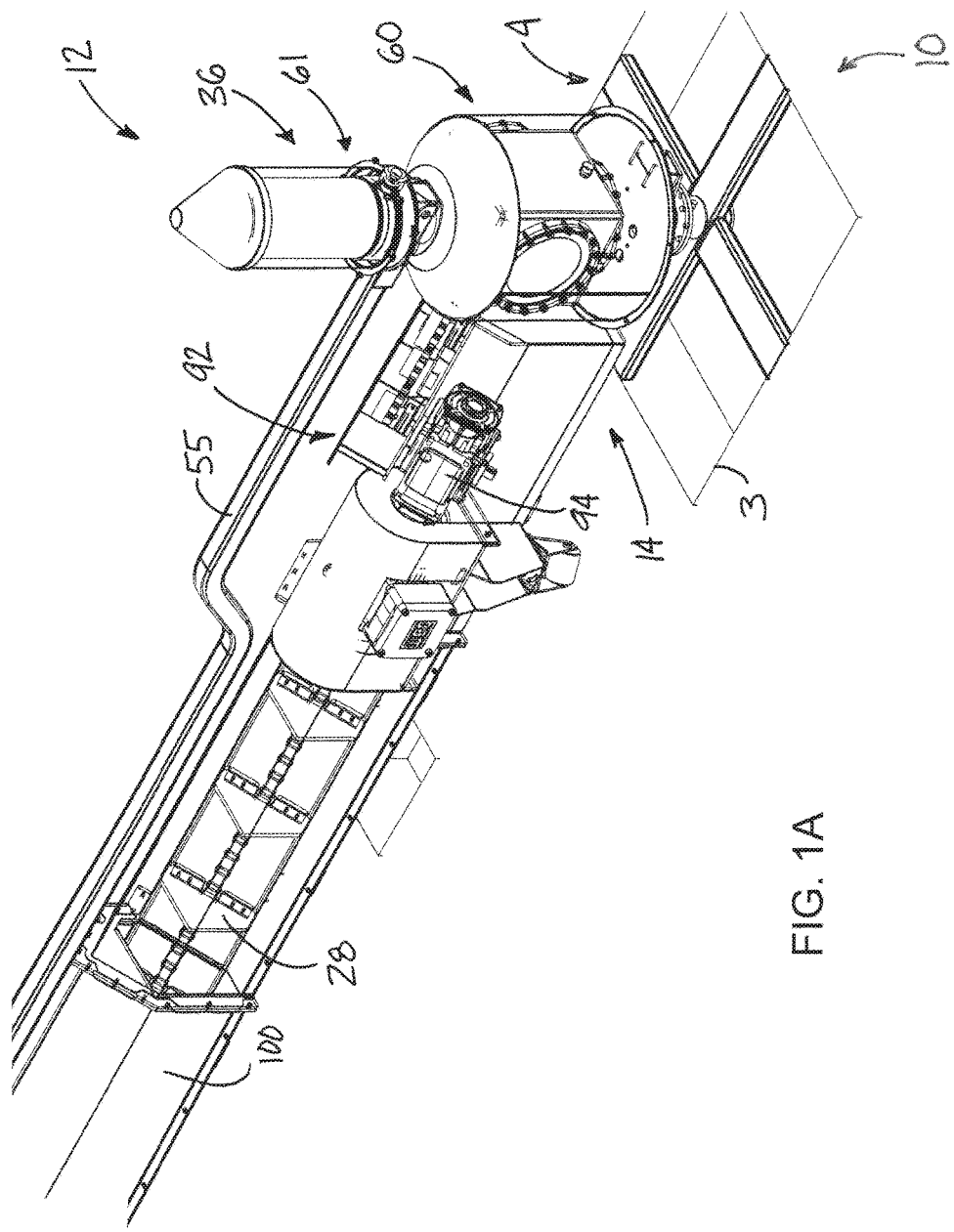
FIG. 1A is a schematic perspective view of an inboard portion of a new bin sweep apparatus including a central assembly according to the present disclosure.
Figure 1B:
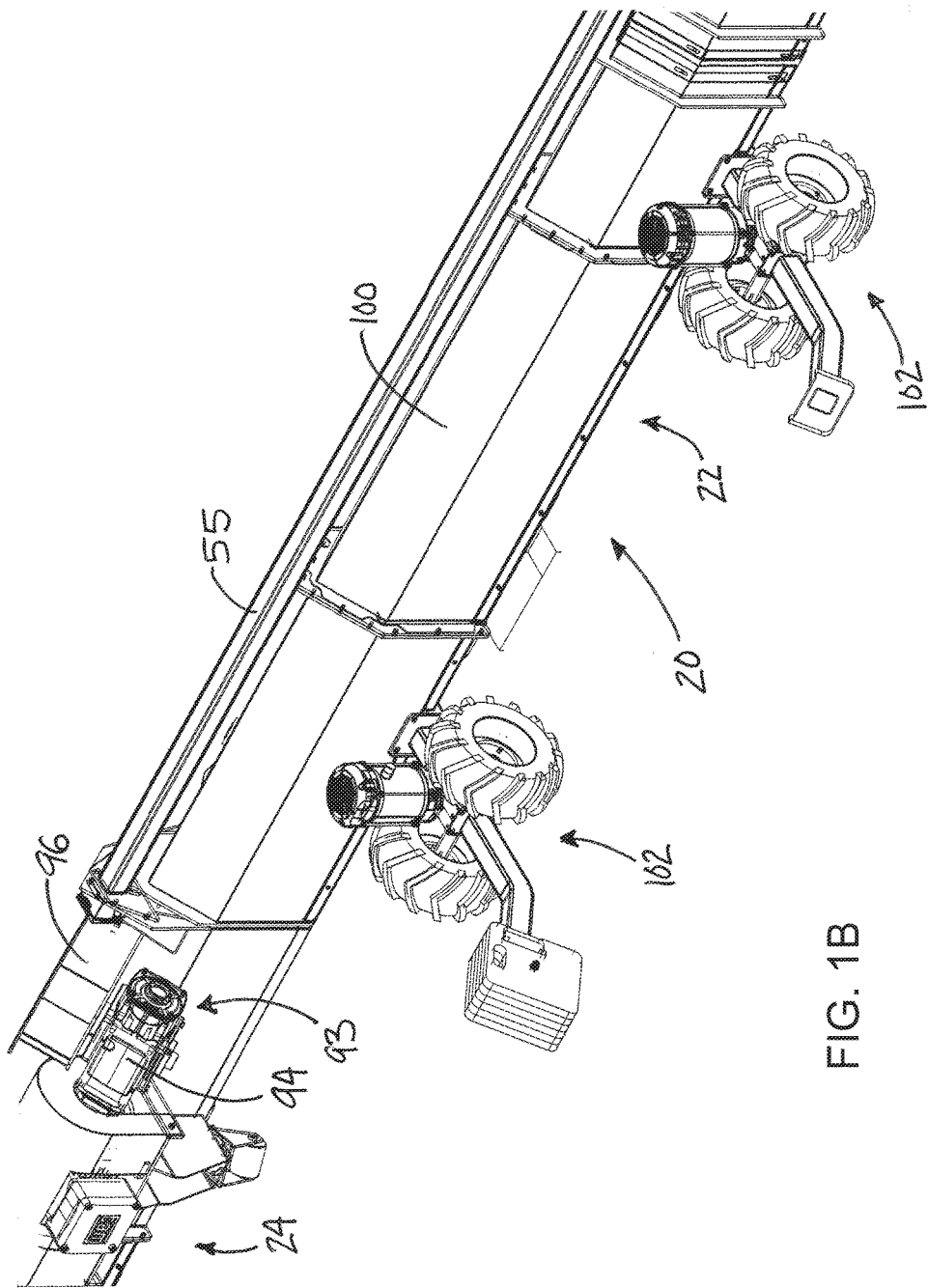
FIG. 1B is a schematic perspective view of a central portion of the bin sweep apparatus including a central assembly according to the present disclosure.
Figure 1C:
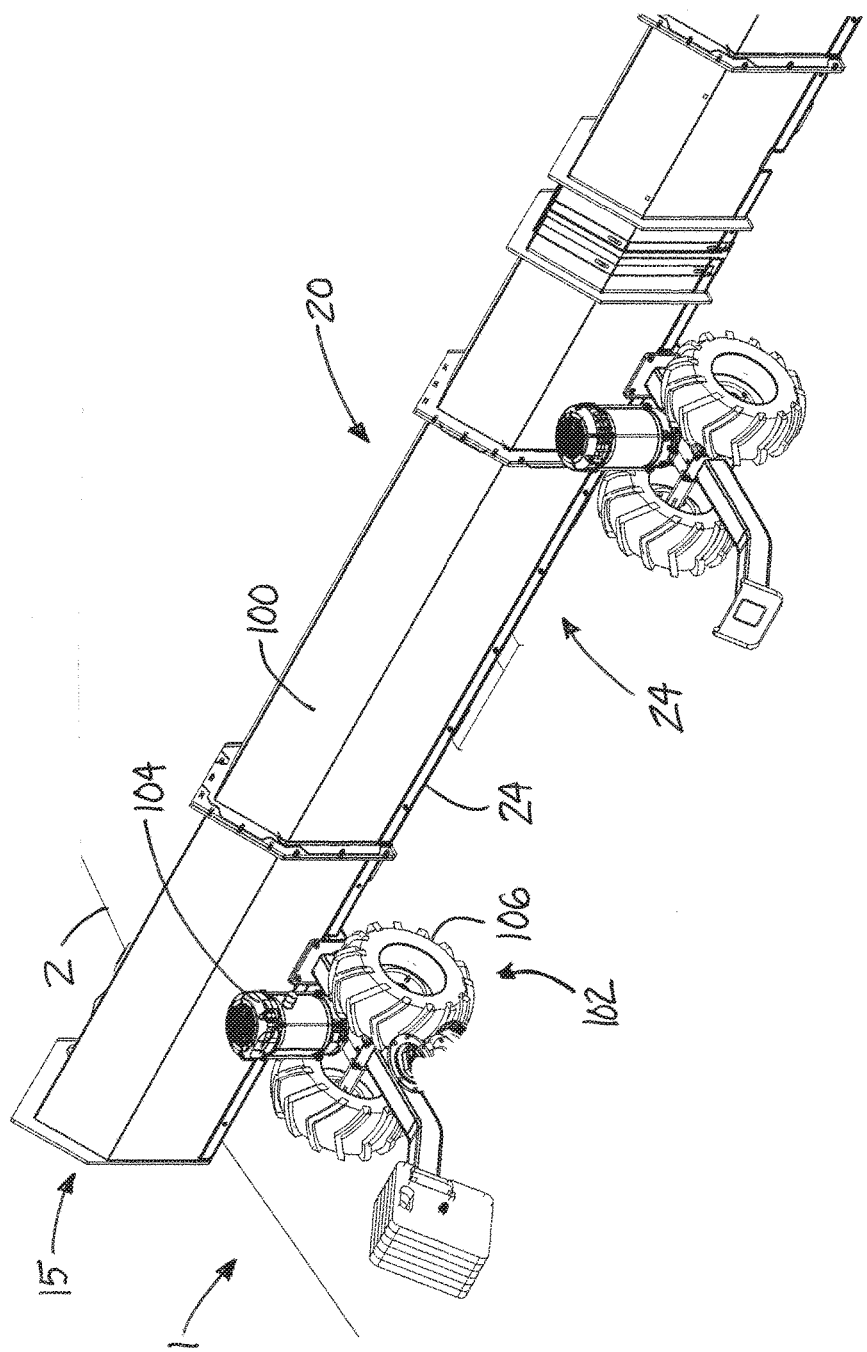
FIG. 1C is a schematic perspective view of an outboard portion of the bin sweep apparatus including a central assembly according to the present disclosure.
Figure 2:
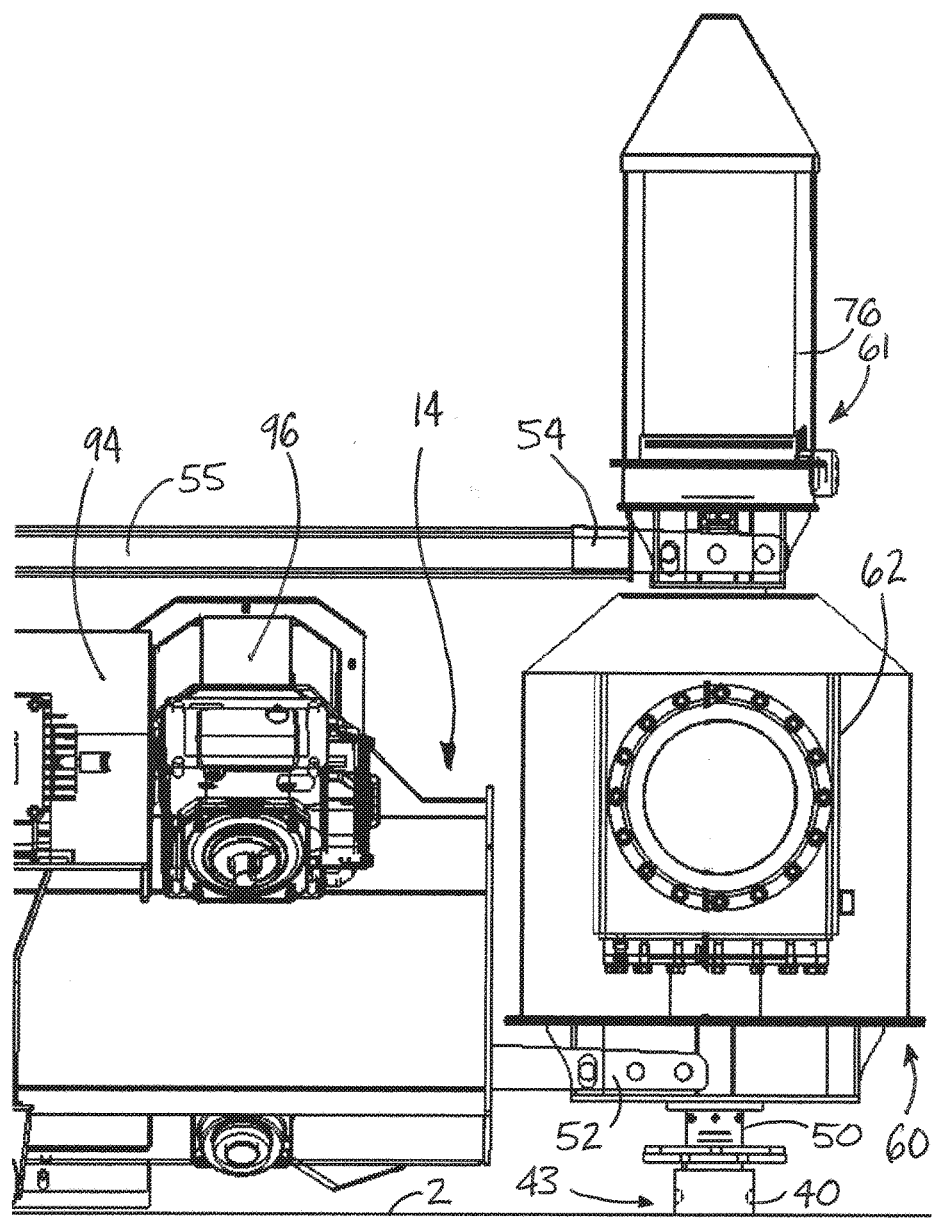
FIG. 2 is a schematic side view of a portion of the bin sweep apparatus showing the central assembly, according to an illustrative embodiment.
Figure 3:
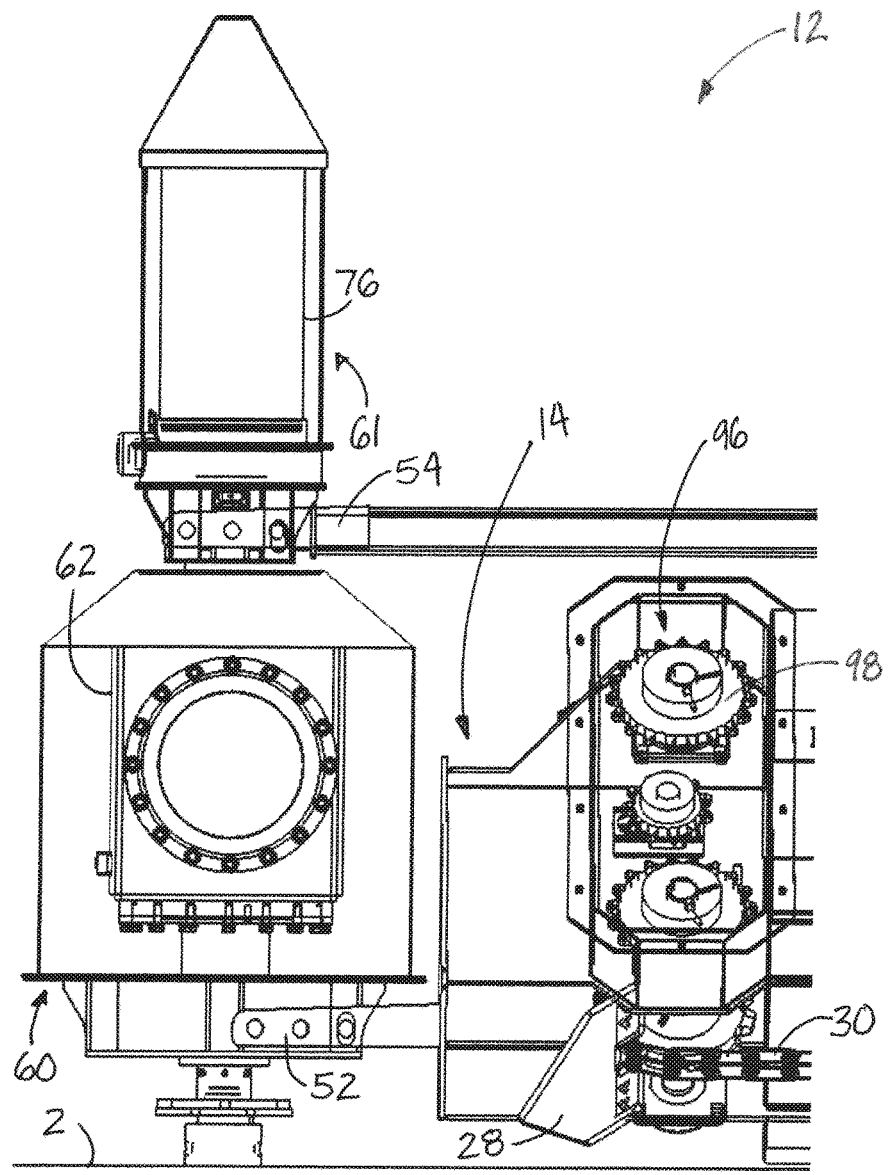
FIG. 3 is a schematic opposite side view of a portion of the bin sweep apparatus showing the central assembly, according to an illustrative embodiment.
Figure 4:
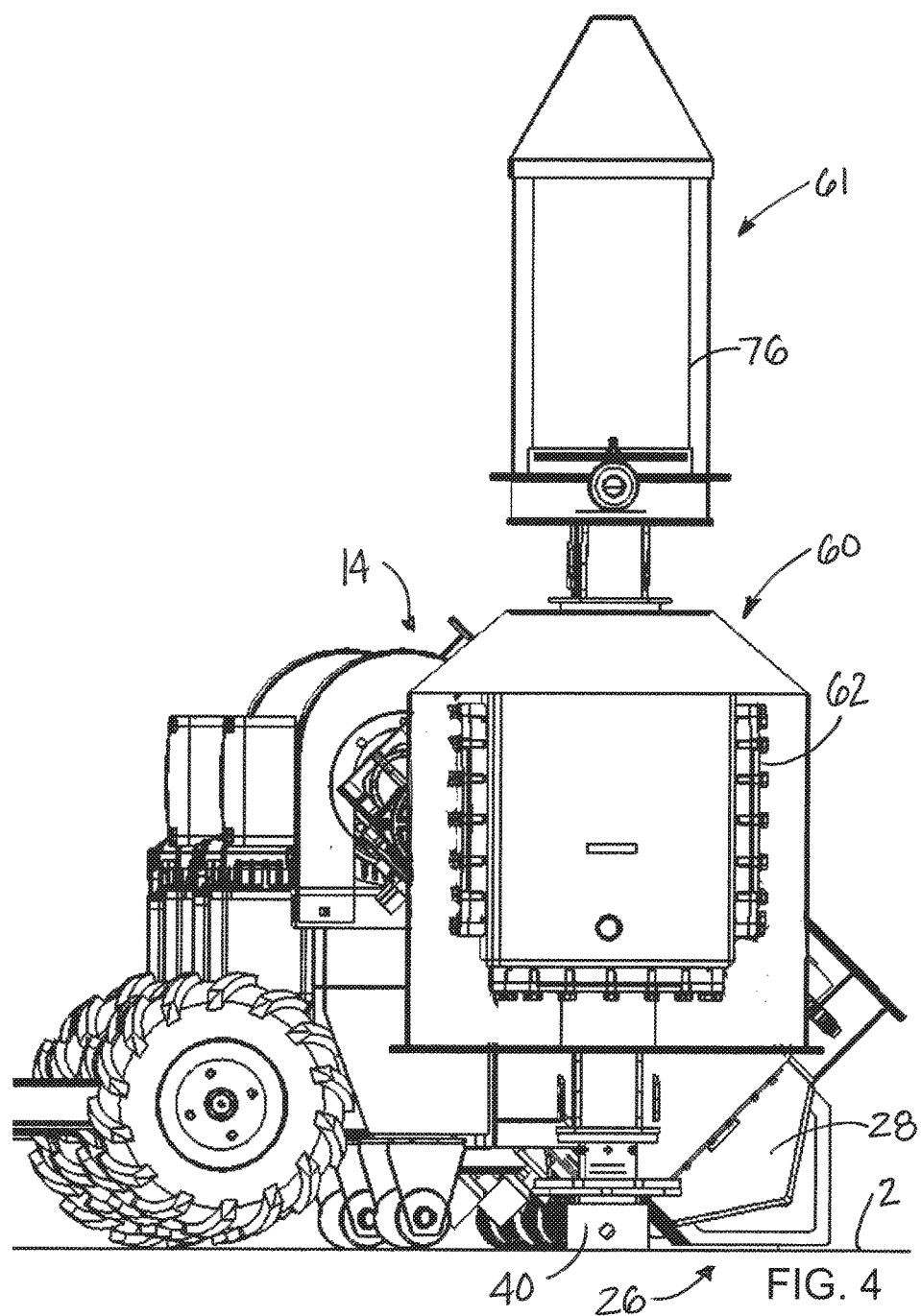
FIG. 4 is a schematic end view of the bin sweep apparatus showing the central assembly, according to an illustrative embodiment.
Figure 5:
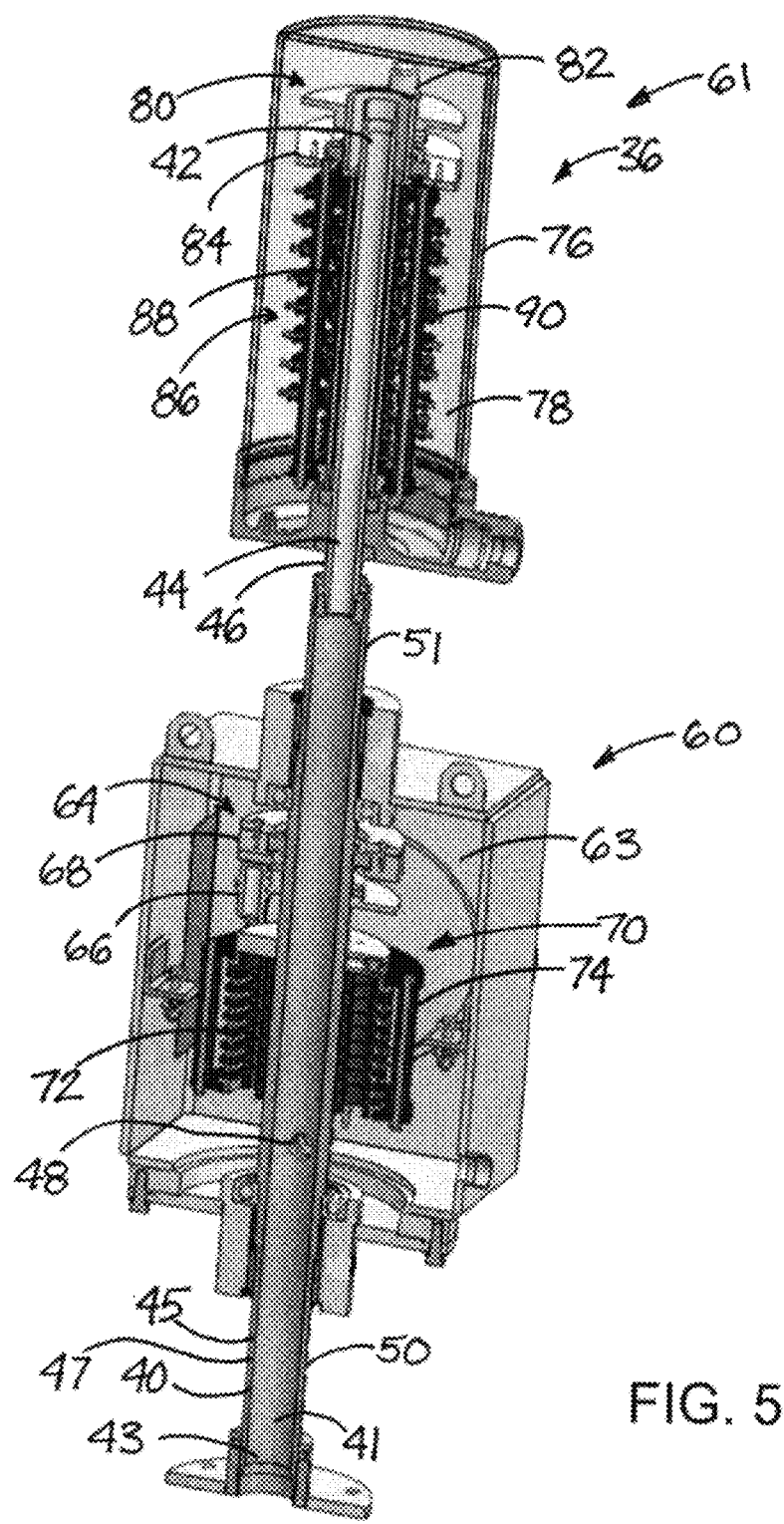
FIG. 5 is a schematic perspective view of the central assembly isolated from the sweep assembly, according to an illustrative embodiment.
Figure 6:
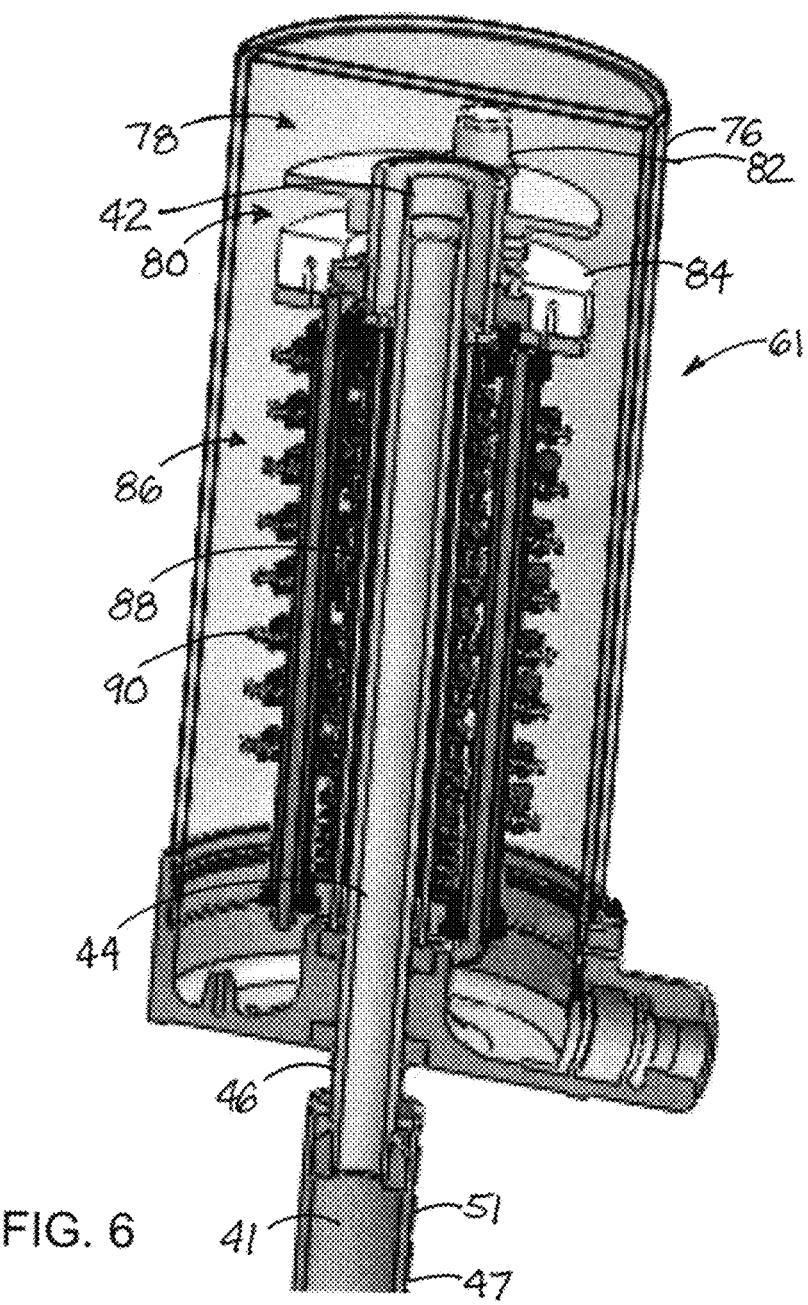
FIG. 6 is a schematic perspective view of a second interface assembly of the central assembly, according to an illustrative embodiment.
Figure 7:
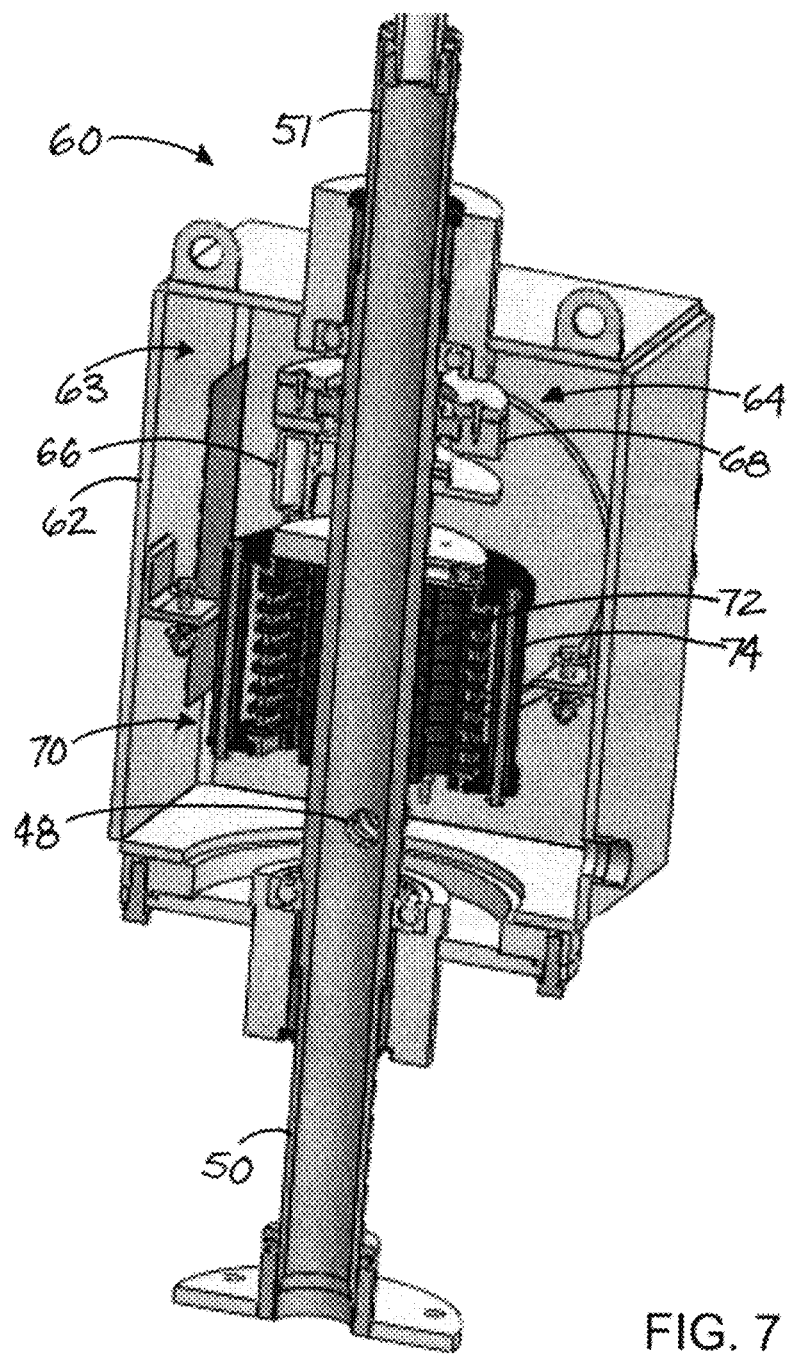
FIG. 7 is a schematic perspective view of a first interface assembly of the central assembly, according to an illustrative embodiment.

With reference now to the drawings, and in particular to FIGS. 1 through 7 thereof, a new bin sweep power transmission system embodying the principles and concepts of the disclosed subject matter will be described.

In one aspect, the disclosure relates to a bin sweep system 10 for moving particulate material in a bin 1. The particulate material may be grain, although this is merely illustrative and the system may be suitable for handling a wide range of different types of particulate material. The bin 1 may have a bin floor 2 on which the particulate material rests after being moved into the interior of the bin and prior to being removed from the interior. A bin sump 3 may extend into the floor 2 of the bin and may be located toward a center 4 of the bin floor. Typically, an additional apparatus may be provided underneath the surface of the bin floor for moving particulate material from the bin sump 3 to a location exterior of the bin when the particulate material is being unloaded from the bin. Additional intermediate sumps may be located in the bin floor, typically generally positioned along a line that corresponds to the extent of the additional apparatus. In many installations, the under-floor additional apparatus includes an enclosed auger that is in communication with, and designed to receive particulate material from, the bin sump 3 as well as any intermediate sumps.

The system 10 may include an elongated sweep apparatus 12 having opposite ends 14, 15 with an inboard end 14 being generally located toward the center 4 of the bin and an outboard end 15 being generally located toward a peripheral area of the bin floor. The sweep apparatus 12 may include at least one sweep assembly 20 that is movable over the floor of the bin and may extend from the inboard end 14 to the outboard end 15 of the sweep apparatus. The sweep apparatus 12 may include one or more sweep assemblies that each move generally about the center 4 of the bin floor. In some embodiments, including the illustrative embodiments described herein, the sweep assembly includes at least two sweep assembly segments, or sweep segments, 22, 24, which are capable of being positioned in a substantially linear array between the inboard 14 and outboard 15 ends of the sweep apparatus, but also may be capable of moving substantially independently of each other such that the sweep segments do not remain in a substantially linear array or line. Illustratively, one of the sweeps segments may be located at a position that is displaced or shifted in a radially outward direction with respect to an other one of the segments, so that the one sweep segment is located closer in a radial direction to the center post than the other sweep segment. In such configurations, when the sweep segments are rotated independently, one of the sweep segments may rotate past or by the other of the sweep segments such that one sweep segment passes or moves between the other sweep segment and the center post. Bin sweep apparatus including these features and capabilities are disclosed, for example, in U.S. patent Ser. No. 14/514,494, filed Oct. 15, 2014, now U.S. Pat. No. 9,864,344; U.S. patent application Ser. No. 14/868,531, filed Sep. 29, 2015, now U.S. Pat. No. 9,809,402; and U.S. patent application Ser. No. 14/955,713, filed Dec. 1, 2015, now abandoned, which are all assigned to the assignee of this patent application and the disclosures of each of these applications are hereby incorporated by reference in their entireties.

The applicant has recognized that providing the sweep assemblies or segments with the ability to move independently of each other, and especially with the ability to move past each other, can create problems with the physical connection of the sweep segments to the center post as well as create problems with the power connection necessary to operate and control the sweep segments particularly when the segments are operable independent of each other. More specifically, as the positions of the sweep segments are not fixed with respect to each other about the center post, one segment may overtake another segment by design or by accident and the physical connection to the center post must be maintained, as well as maintaining the power to and the control of the segments.

In some embodiments, a sweep assembly or sweep segment may comprise at least two units which are connected together to form the sweep segment and move together. The sweep assembly 20, and any segments forming the sweep assembly, may have a forward side that is generally oriented toward a direction of movement of the sweep apparatus and a rearward side that is generally oriented away from the direction that the assembly moves.

The sweep assembly 20 may comprise a particulate sweep structure 26 which is generally configured to move particulate material resting on the bin floor toward one end of the sweep apparatus, typically but not necessarily the inboard end 14. In embodiments having multiple sweep segments, each of the sweep segments may include a sweep structure 26. In the illustrative embodiments, the particulate sweep structure 26 may include a plurality of interconnected paddles 28 that are movable in a succession on a path along at least a portion of the sweep assembly or the sweep segment, and each of the paddles may have a perimeter edge with at least a portion of the perimeter edge being located in a close proximate relationship with the surface of the bin floor. The sweep structure 26 may also include an endless loop member 30 on which the paddles of the plurality of paddles are mounted at generally spaced locations along the endless loop member. The loop member may be configured to move the paddles along the path and may support the paddles during at least a portion of the movement along the path. The endless loop member may have an incoming stretch generally moving from the outboard end toward the inboard end, and paddles positioned along the incoming stretch generally push particulate material toward the center 4 of the bin floor. The loop member may also have an outgoing stretch generally moving from the inboard end toward the outboard end which generally does not engage and move particulate material. In some embodiments, the endless loop member 30 comprises a series of interconnected links and may include a plurality of chain links including links to which the individual paddle members are connected.

The sweep apparatus 12 may also include a central assembly 36 which may be generally positioned at the center 4 of the bin floor 2. The central assembly may be positioned adjacent to, or over, the bin sump 3. The central assembly may be configured to guide movement of one or more sweep assemblies, and/or one or more sweep segments, generally about the center 4 of the bin floor. The central assembly 36 may include a center post 40 which may extend generally upwardly with respect to the surface of the bin floor 2, and may be oriented along a substantially vertical axis. The center post 40 may define a passage 41 therein, and in some embodiments the post may be hollow, although the post need not necessarily be of hollow character. The passage may carry various power transfer elements, such as electrical power cables, signal wires, fluid conduits, etc. The center post has an upper end 42 and a lower end 43, and may have an upper portion 44 located toward the upper end 42 and a lower portion 45 located toward the lower end 43, and the passage may extend through the upper and lower portions and from the lower end to the upper end. In some embodiments, the center post 40 may have more than one part, including an upper part 46 generally forming the upper portion and a lower part 47 generally forming the lower portion. The upper part may be mounted on the lower part in a manner that generally secures the upper part with respect to the lower part against rotation relative to the lower part. The lower part 47 may have an aperture 48 formed therein for providing access to the passage 41 for purposes explained elsewhere in this description. The post may have a first section 50 and a second section 51, and the first section may be located below the second section and in some embodiments the first and second sections may be located on the lower part 47 of the post.

The central assembly 36 may also include a first sweep segment connector 52 which connects the first sweep segment 22 to the center post, generally in a manner that allows the first sweep segment to rotate with respect to the post, generally through the rotation of the first sweep segment connector 52 with respect to the post. The first sweep segment connector 52 may engage the first section 50 of the center post. A second sweep segment connector 54 may be provided for connecting the second sweep segment 24 to the center post, and the second sweep segment connector may be rotatable with respect to the post to permit rotational movement of the sweep segment 24 about the post. The second sweep segment connector 54 may engage the second section 51 of the center post. The second sweep segment connector 54 may be connected to an arm 55 which in turn is connected to the housing of the second sweep segment 24, and reaches over the first sweep segment to the second sweep segment to permit movement of the first sweep segment by the second sweep segment.

Another aspect of the central assembly 36 that may be used in combination with the aforementioned sweep apparatus and bin elements is a pair of sweep interface assemblies 60, 61 in which each of the interface assemblies 60, 61 may be associated with one of the sweep assemblies, or in the case of the illustrative embodiments, one of the sweep segments. The sweep interface assemblies may provide a number of different functions, including the ability to sense a current position of each of the sweep assemblies, provide power to the sweep assemblies or segments for operation, etc. The sweep interface assemblies 60, 61 may be configured to supply power to each of the sweep assemblies individually and simultaneously for facilitating independent operation of the segments. The assemblies 60, 61 may also sense the current positions of the sweep segments independently of each other.

The interface assemblies may include a first interface assembly 60 associated with the first sweep segment 22 and a second interface assembly 61 associated with the second sweep segment 24. In greater detail, the first interface assembly 60 may include a first housing 62 which defines a first housing interior 63. The first housing 62 may be mounted on the post and may enclose a portion of the post, such as a portion of the lower portion of the post located above the first section 50 of the post. The first housing 62 may be rotatable with respect to the post, and may employ bearings or bushings or another suitable interface in order to facilitate the rotation of the housing on the post. In some embodiments, the first housing is configured such that it is able to trap and confine any flame originating in the first housing interior 63 within the interior and not travel outside the housing.

The first interface assembly 60 may also include a first position sensing device 64 which is configured to sense a current position of the first sweep segment 22 with respect to a reference position of the sweep segment, such as a home position. In some implementations, the home position may be an orientation in which the sweep segment is generally aligned with and positioned adjacent to one or more of the sumps formed in the bin floor. The first position sensing device 64 may include a first sensor 66 and a first target 68 which may be located in the interior 63 of the first housing 62. At least one of the first sensor 66 and the first target 68 may be mounted on the post to remain stationary with respect to the post, and the other one of the sensor 66 and target 68 may be rotatable with the first sweep segment 22 about the post. The other one of the sensor 66 and target 68 may be mounted on the first housing 62 to rotate with the housing and the first sweep segment. In the illustrative embodiments, the first target 68 rotates with respect to the post with the housing while the first sensor 66 remains relatively stationary with respect to the post. The first sensor 66 may generate a first position signal that generally corresponds to the current position of the first sweep segment with respect to the reference position for the first sweep segment.

The first interface assembly 60 may also include a first power communication device 70 that is configured to transmit power to the first sweep segment 22. The illustrative embodiments of the first power communication device 70 may be configured to transmit electrical power to the first sweep segment, although other forms of power may be transmitted to the first sweep segment through the interface assembly 60 such as, for example, fluid (e.g., hydraulic or pneumatic) power. The first power communication device 70 may include a first stationary contact element 72 mounted on the post in a manner such that the element 72 remains stationary with respect to the post. In some embodiments, the first stationary contact element may comprise at least one slip ring generally encircling a portion of the post. The first power communication device 70 may also include a first movable contact element 74 which is in contact with the first stationary contact element to thereby transfer electrical energy from the first stationary contact element to the first movable contact element. The first movable contact element may be mounted on the post in a manner that permits rotation of the movable contact element 74 with respect to the stationary contact element 72. The first movable contact element 74 may be mounted on or otherwise connected to the first housing 62 such that the movable contact element rotates with the housing with respect to the post. In some embodiments, the first movable contact element 74 may comprise one or more brushes that are biased into contact with the slip ring of the stationary contact element 72. The first movable contact element 74 may be in electrical communication with various devices of the first sweep segment that require power. Further, it should be recognized that control signals may also be transferred to devices on the first sweep segment using similar contact element structures.

The second interface assembly 61 may also be mounted on the center post 40, and in some embodiments may be located above the first interface assembly 60 on the center post. The second interface assembly may also be located above the second section 51 of the post, and may be in relatively close proximity to the second sweep segment connector 54 that connects the second sweep segment to the center post. The second interface assembly may include a second housing 76 which defines a second housing interior 78 which may be mounted on the post 40 and may enclose a section of the post in the housing interior 78. The second housing 76 may be rotatable with respect to the post, and may include suitable bearings, bushings, or the like to facilitate such rotation. In some embodiments, the second housing 76 is configured to trap fire or flame that may originate within the interior 78. The second interface assembly 61 may also include a second position sensing device 80 that is configured to sense the current position of the second sweep segment with respect to a reference position for the second sweep segment. The reference position of the second sweep segment may be a home position for the sweep segment, and may also be located adjacent to a line of one or more sumps formed in the bin floor although other home positions may be utilized. The second position sensing device 80 may include a second sensor 82 and a second target 84 which may be located in the interior 78 of the second housing. At least one of the second sensor and the second target may be mounted on the post to remain stationary with respect to the post, and the other one of the second sensor and the second target may be rotatable with the second sweep segment about the post. In the illustrative embodiments, the second target 84 rotates with respect to the post with the housing while the second sensor 82 remains relatively stationary with respect to the post. The second sensor 82 may generate a second position signal that generally corresponds to the current position of the second sweep segment with respect to the reference position for the second sweep segment.

The second interface assembly 61 may also include a second power communication device 86 that may be configured to transmit power to the second sweep segment 24. The second power communication device may be configured to transmit electrical power to the second sweep segment, although other types or forms of power may be transmitted by the power communication device 86. In the illustrative embodiments, the second power communication device comprises a second stationary contact element 88 which is mounted on the post to be stationary with respect to the post, and in illustrative embodiments, the second stationary contact element comprises at least one slip ring which encircles the center post 40. The second power communication device 86 may also include a second movable contact element 90 which is in contact with the second stationary contact element 88 to thereby transfer electrical energy from the second stationary contact element to the second movable contact element. The second movable contact element may be mounted on the post in a manner that permits rotation of the element 90 with respect to the second stationary contact element as well as the post. The second movable contact element may be mounted on the housing to rotate with the housing and also with the second sweep segment 24. Illustratively, the second movable contact element 90 comprises at least one brush biased into contact with the slip ring of the second stationary contact element 88. The second movable contact element 90 may be in electrical communication with various devices of the second sweep segment that require power. Further, it should be recognized that control signals may also be transferred to devices on the second sweep segment using similar contact element structures.

The sweep apparatus may further include at least one paddle movement assembly 92, and a movement assembly 92, 93 may be provided of each of the sweep assemblies, or each of the sweep segments of a sweep assembly, to move the plurality of interconnected paddles along the path and generally cause the endless loop member 30 to move between the incoming and outgoing stretches. In some embodiments, the paddle movement assembly 92, 93 may be located in a power unit when the sweep assembly or sweep segment is comprised of a plurality of units. The power unit may be positioned toward the inboard end 14 of the sweep apparatus, as well as the proximal end of a sweep segment, although other relative positioning may be employed. The paddle movement assembly may illustratively comprise a motor 94 for rotating the endless loop member 30, and the motor may have a rotatable drive shaft extending from the motor and being rotated by operation of the motor. The paddle movement assembly may have a drive linkage 96 that is configured to connect the motor to the endless loop member. More specifically, the drive linkage may link the motor to and thereby rotate a rotatable drive member 98 on which a portion of the endless loop member is entrained, and the rotatable drive member may engage a portion of the endless loop member at a transition between the incoming and outgoing stretches. The rotatable drive member 98 may be positioned toward the proximal end of the sweep segment, and thus may guide the transition of the endless loop member between the incoming and outgoing stretches. In embodiments of the apparatus 10 in which the loop member 30 comprises a chain, the drive member 98 may comprise a sprocket. The motor 94 may receive power through the respective interface assembly.

In some embodiments, the endless loop 30 may generally rotate about horizontally-oriented axes, e.g., with the drive member 98 rotating about a substantially horizontally-oriented axis. In such embodiments, the inbound extent may be a relatively lower extent of the endless loop and the outbound extent may be a relatively upper extent of the endless loop. In some embodiments, the endless loop 30 may generally rotate about vertically-oriented axes, e.g., with the drive member 98 rotating about a substantially horizontally-oriented axis. In such embodiments, the inbound extent may be a relatively forward extent of the endless loop and the outbound extent may be a relatively rearward extent of the endless loop. In some embodiments, the axes about which the endless loop member generally rotates may be tilted between the vertical and the horizontal, and the axes may be oriented at angles in the range of approximately 30 degrees to approximately 60 degrees from a vertical axis. In such embodiments, the drive member may rotate about a tilted axis.

The sweep assembly may also include a housing 100 that generally extends between the opposite ends of the sweep assembly, or a sweep segment, and defines an interior. A portion of the particulate sweep structure 26 may be positioned in the interior of the housing. The incoming stretch of the endless loop member 30 and paddles 28 mounted thereon may be located below the housing or in a lower space of the housing, and in some embodiments the housing may not provide any enclosure of the incoming stretch and paddles mounted thereon. The housing 100 may extend across a plurality of units where multiple units are employed to form a sweep assembly or segment.

A sweep drive assembly 102 may be mounted on the sweep assembly and may be configured to cause the sweep to move or travel across the bin floor in a forward direction toward an accumulation or pile of particulate material. The sweep drive assembly 102 may be located rearwardly of the sweep assembly and may be located toward the outboard end of the elongated sweep assembly, although other configurations of the drive assembly 102 are possible. In embodiments employing multiple segments in the sweep apparatus, an individual sweep drive assembly may be provided for each segment and may be located at the distal end of the respective segment. The sweep drive assembly 102 may be driven by movement of the particulate sweep structure, although in some embodiments the sweep drive assembly utilizes a dedicated drive motor 104 which drives at least one drive wheel 106 through a drive gear box. Those skilled in the art will recognize that other means for moving the sweep apparatus in a forward direction may also be utilized.

The foregoing description of an implementation of elements of the disclosure on a bin sweep utilizing paddles is merely illustrative, and aspects of the disclosure may be suitable for use with other bin sweep technologies including, for example, auger-based sweeps.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A central assembly for a bin sweep apparatus having at least two sweep elements movable substantially independently of each other about the central assembly, the assembly comprising:
   a center post; and
   a pair of sweep interface assemblies on the center post, each sweep interface assembly being associated with one of the sweep elements of the bin sweep apparatus, each sweep interface assembly being configured to provide power to the associated one of the sweep elements.

2. The central assembly of claim 1 wherein the at least two sweep elements include a first sweep segment and a second sweep segment; and additionally comprising:
   a first sweep segment connector configured to connect the first sweep segment to the center post and being rotatable with respect to the center post; and
   a second sweep segment connector configured to connect the second sweep segment to the center post and being rotatable with respect to the post independently of the first sweep segment connector.

3. The central assembly of claim 2 wherein the first and second sweep segment connectors are configured such that the first sweep segment is rotatable about the center post past the second sweep segment.

4. The central assembly of claim 1 wherein the pair of sweep interface assemblies is configured such that a first one of the sweep elements is rotatable about the center post past a second one of the sweep elements.

5. The central assembly of claim 1 wherein each of the sweep interface assemblies is configured to simultaneously provide electrical power to the sweep elements.

6. The central assembly of claim 1 wherein at least one of the interface assemblies comprises a power communication device configured to transmit electrical power to the one of the sweep elements.

7. The central assembly of claim 1 wherein the power communication device comprises:
   a stationary contact element mounted on the center post to be stationary with respect to the post; and
   a movable contact element movable with a said sweep element and being in contact with the stationary contact element to transfer electrical energy from the stationary contact element to the movable contact element.

8. The central assembly of claim 7 wherein the stationary contact element comprises at least one slip ring and the movable contact element comprises at least one brush.

9. The central assembly of claim 1 wherein at least one of the interface assemblies comprises a housing defining a housing interior and being mounted on the post, the housing being rotatable with respect to the post, a power communication device of the interface assembly being located in the housing interior.

10. The central assembly of claim 1 wherein each of the sweep interface assemblies is configured to sense a position of a respective said sweep element.

11. The central assembly of claim 10 wherein at least one of the sweep interface assemblies comprises a position sensing device configured to sense a current position of a respective said sweep element with respect to a reference position.

12. The central assembly of claim 11 wherein the position sensing device comprises a sensor and a target, at least one of the sensor and the target being mounted on the post to remain stationary with the post and another one of the sensor and the target being rotatable with a sweep segment connector about the post.

13. The central assembly of claim 12 wherein the sensor generates a position signal corresponding to the current position of the sweep segment connector with respect to the reference position.

14. A bin sweep system comprising:
   a center post;
   a first sweep segment;
   a second sweep segment;
   a first sweep segment connector configured to connect the first sweep segment to the center post in a manner such that the first sweep segment is rotatable with respect to the center post;
   a second sweep segment connector configured to connect the second sweep segment to the center post in a manner such that the second sweep segment is rotatable with respect to the center post, the first and second sweep segment connectors being configured such that the first sweep segment is rotatable about the center post past the second sweep segment;
   a first sweep interface assembly configured to provide electrical power to the first sweep segment as the first sweep segment moves past the second sweep segment; and
   a second sweep interface assembly configured to provide electrical power to the second sweep segment.

15. The system of claim 14 wherein each of the sweep interface assemblies is configured to sense a position of a respective said sweep segment.

16. The system of claim 14 wherein at least one of the sweep segments includes a particulate sweep structure configured to move particulate matter on the floor beneath the sweep apparatus toward one end of the elongated sweep apparatus, the particulate sweep structure including a plurality of interconnected paddles movable in a succession on a path along at least a portion of the sweep segment and an endless loop member on which the paddles of the plurality of paddles are mounted at spaced locations along the endless loop member.

17. A central assembly for a bin sweep apparatus having at least two sweep elements movable substantially independently of each other about the central assembly, the assembly comprising:
- a center post; and
- a pair of sweep interface assemblies on the center post, each sweep interface assembly being associated with one of the sweep elements of the bin sweep apparatus, each sweep interface assembly being configured to sense a position of the associated one of the sweep elements.

18. The central assembly of claim 17 wherein at least one of the sweep interface assemblies comprises a position sensing device configured to sense a current position of a respective said sweep element with respect to a reference position.

19. The central assembly of claim 18 wherein the position sensing device comprises a sensor and a target, at least one of the sensor and the target being mounted on the post to remain stationary with the post and another one of the sensor and the target being rotatable with a sweep segment connector about the post.

20. The central assembly of claim 17 wherein at least one of the interface assemblies comprises a power communication device configured to transmit electrical power to the one of the sweep elements.

\* \* \* \* \*